United States Patent
Lecoutre et al.

(10) Patent No.: US 6,532,238 B1
(45) Date of Patent: Mar. 11, 2003

(54) INTERCONNECTION BETWEEN ADDRESSABLE ELEMENTS OF A MICROCOMPUTER FOR ACTIVE IMPLANTABLE MEDICAL DEVICES

(75) Inventors: Christophe Lecoutre, Saint Cyr l'ecole (FR); Isabelle Izaute, Paris (FR); Stephen J. Swift, San Diego, CA (US)

(73) Assignee: ELA Medical S.A., Montrouge (FR)

( * ) Notice: Subject to any disclaimer, the term of this patent is extended or adjusted under 35 U.S.C. 154(b) by 0 days.

(21) Appl. No.: 09/332,281

(22) Filed: Jun. 11, 1999

(30) Foreign Application Priority Data

Jun. 12, 1998 (FR) .............................................. 98 07431

(51) Int. Cl.$^7$ ................................................ H04J 15/00
(52) U.S. Cl. ........................... 370/403; 370/404; 607/4; 607/32
(58) Field of Search ................................ 370/449–463, 370/419, 403, 404, 406, 223; 607/4, 5, 32

(56) References Cited

U.S. PATENT DOCUMENTS 4,999,832 A  3/1991  Chen et al. ............... 370/85.14
6,061,335 A  * 5/2000  De Vito et al. ............. 370/258
6,091,705 A  * 7/2000  Regula ........................ 370/223

FOREIGN PATENT DOCUMENTS

EP         0 691 767     1/1996     ......... H04L/12/433
WO         WO 90/16026  12/1997     ............ G06F/13/00

* cited by examiner

Primary Examiner—Salvatore Cangialosi
(74) Attorney, Agent, or Firm—Orrick, Herrington & Sutcliffe LLP

(57) ABSTRACT

An interconnection structure including an interconnection artery ensuring the parallel transfer, on a group of conductors, of information to be exchanged, configured in at least one ring (50; 60; 70) on which information circulates in a closed loop and in a one-way direction. The artery has a plurality of coupling points to the addressable elements of the microcomputer. Some of the points of coupling (10, 20, 30) include a register associated with the corresponding addressable element with the microcomputer, and others include a gateway (G1, G2. . . . GN) towards, and from, another ring of a lower order, on which lower order ring information also circulates in a closed loop and in a one-way direction. This results in a structure of plurality of hierarchised rings. The interconnection structure is particularly useful for battery operated processor controlled devices, such as active implantable medical devices, pacemakers, defibrillators and the like.

19 Claims, 2 Drawing Sheets

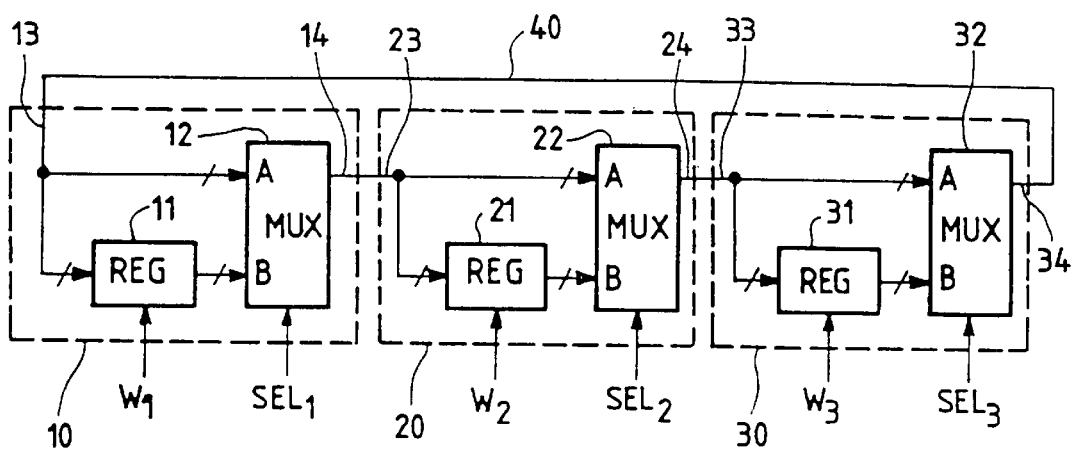
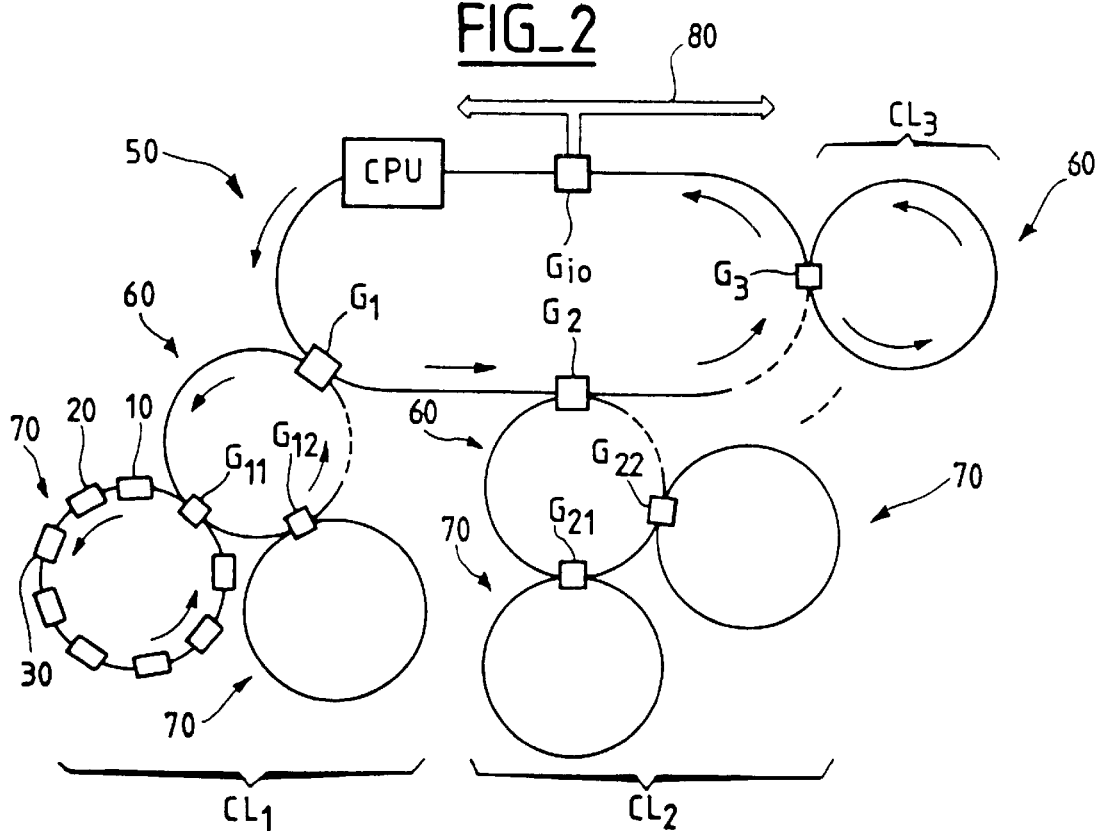

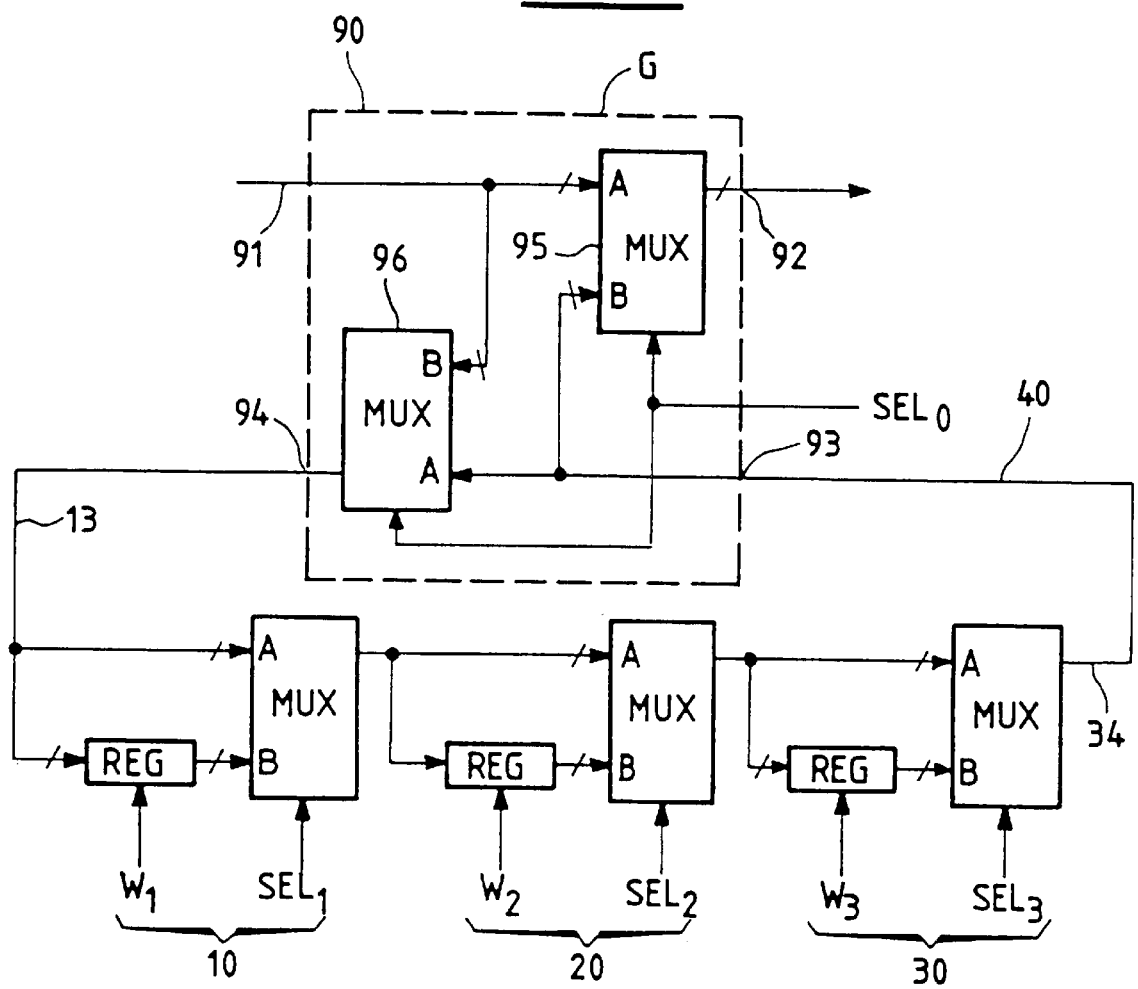
FIG_3
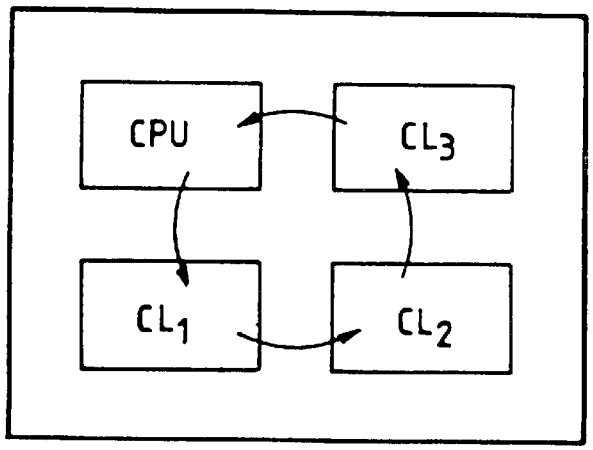
FIG_4

INTERCONNECTION BETWEEN ADDRESSABLE ELEMENTS OF A MICROCOMPUTER FOR ACTIVE IMPLANTABLE MEDICAL DEVICES

FIELD OF THE INVENTION

The present invention relates to the interconnection structure for data exchange between the various addressable elements of a microcomputer, more particularly to the microcomputer of an active implantable medical device such as a pacemaker or a cardiac defibrillator.

BACKGROUND OF THE INVENTION

The energy consumption of the microcomputer is a factor which must carefully be controlled in battery operated devices, such as active implantable medical devices. This is because it has a direct impact on the service life of the implant, i.e., the number of years until the devices reaches the end of its useful life when a surgical intervention will be necessary to change the implant.

In this regard, the use of increasingly complex microcomputer structures has led to an increase on the microcircuit (integrated circuit) of read-write memories (RAMs), read only memories (ROMs), data registers, direct memory access (DMA), interrupt control elements, etc. (hereinafter collectively and generically referred to as "addressable element(s)" of the microcomputer).

These various addressable elements are inter-connected to allow data exchange therebetween. This occurs by means of a structure, including a common interconnection artery, ensuring a parallel transfer, over a group of conductors, of the information to be exchanged. The typical structure of such an interconnection artery is that of the bi-directional bus to which all the elements of the microcomputer are connected. The data exchange can take place in one direction, for example, from the central processing unit towards a memory for a write instruction, or in the opposite direction, for example, from a memory towards the central processing unit for a read instruction. The multiplication (increase) of the number of addressable elements connected to such a bi-directional data bus brings with it, however, a certain number of difficulties, which have a serious consequence on energy consumption, a critical factor in the field of implanted medical devices, as noted above.

First, a bi-directional bus connected to many addressable elements implies, from the electronic point of view, a large parasitic capacitor connected to ground. This parasitic capacitor on the one hand will increase the time necessary to modify the logical state of the conductors of common interconnection artery. This is because the relatively greater time necessary to load each of the bus conductors leads to more bus data transfer cycles, and to transfer cycles which are longer. In addition and especially, the charge and the discharge of this capacitor with each change of the logical state will appreciably increase the power consumption of the circuit.

Various solutions have been proposed to cure this disadvantage, for example, by increasing the size of the bus conductors to be able to charge and discharge more quickly the parasitic capacitor. But the increase in the conductor size induces an even larger capacitor, and is moreover made to the detriment of the surface area of the integrated circuit. This is a particularly annoying consequence in the case of implantable medical devices, for which miniaturization is particularly important.

Another disadvantage is that each addressable element receives transition signals from the bi-directional bus, which implies a useless energy consumption. A possible solution consists of dividing the bi-directional bus in a multitude of bi-directional sub-buses. This solution suffers the disadvantage from the point of view of the routing of conductors, i.e., to the detriment of surface area used. To remain compatible with the imposed cycle times, the controllers for the bus conductors are activated with a certain overlapping period which corresponds to short-circuits, and this is done at the cost of a transitory increase in the power consumption of the circuit.

In addition, the bi-directional bus conductors have one of three states, namely, '1', '0', and a state with high impedance. The latter state corresponds to an absence of transmission data on the bus, i.e., a state not controlled. In microcomputers with low current consumption, in particular those which inhibit or otherwise reduce the operation of the clock system to save energy, it is essential that the circuit does not cease functioning at the time when a segment of bus is in a state with high impedance, because floating inputs on CMOS circuits would lead to high currents. This is contrary to the desired results of saving energy and reducing current. To prevent this, one can place on the bus clamping circuits or repeater circuits, which maintain the state of the bus in the absence of any control. These circuits make it possible to avoid any floating input, but nevertheless consume energy for their update, with each transaction occurring on the bus.

OBJECTS AND SUMMARY OF THE INVENTION

It is, therefore, an object of the present invention to overcome the aforementioned disadvantages, by proposing an interconnection structure which minimizes, if not avoids, the recourse to a bi-directional bus.

It is another object of the invention to provide an interconnected structure which is well suited to complex miniaturized circuits having low current consumption.

Broadly, the present invention provides an interconnection structure which includes an interconnection artery, ensuring the parallel transfer of information to be exchanged over a group of conductors, configured in at least one ring on which information circulates in a closed loop and in a one-way direction, this artery comprising at least one coupling point to an addressable element of the microcomputer, more preferably a plurality of coupling points between the ring and the various addressable elements of the microcomputer.

In one embodiment, at least some of the coupling points include a gateway circuit connecting one ring to another ring of a lower order, on which lower order ring information also circulates in a closed loop and in a one way-direction. The gateway thus provides for a transfer of data between the coupled rings, which in combination can comprise a structure comprising a plurality of ordered rings having a hierarchy between them.

In this embodiment, it is in particular envisaged that the ring of the highest order will have one coupling point connecting it to a central processing unit of the device, more particularly to the central processing device which controls the treatment (therapeutic or diagnostic) of an active implantable medical device.

In addition, the gateway circuit between rings advantageously includes one or more multiplexers to transfer selectively downstream from the higher order ring, either the information received from the lower order ring, if the coupling point corresponding to the addressed element is on the lower order ring, or a ring of a still lower order coupled to the former lower order ring, or otherwise the information is received from a higher order ring upstream.

Advantageously, at least some of the coupling points include a register associated with the corresponding microcomputer addressable element, and more preferably also include a multiplexing means to transfer selectively downstream from the ring either the contents of the register, if the coupling point corresponds to the addressed element, or otherwise the information received from the ring upstream.

In one embodiment, one of the coupling points can be a coupling point to a bi-directional data exchange bus, this coupling point being then preferably located on a higher order ring and immediately preceding in the direction of flow of information the central processing unit (CPU) on this ring.

Preferably, the interconnection artery conductors of the rings operate with two-level logic, and without any high impedance state.

Preferably also, the microcomputer circuit presents a topology of implementation in which, for each of the rings, the elements belonging to the same ring are gathered (laid out in silicon) in proximity on a common field, and the fields corresponding to the different rings are in turn laid out adjacent to one another, immediately following or preceding one another, according to the direction of information flow.

Advantageously, in accordance with the present invention, the abandonment of bi-directional bus architecture as the backbone artery of data exchange, and in particular the state with high impedance, will allow, to greatly reduce the parasitic capacitor with its noted disadvantages, and avoid the problems associated with the presence of transitions from one direction to the other on the bus.

Among the other advantages obtained by the invention are: (1) less current (energy) consumption for the same topology of circuit (i.e., for the same number of different interconnected addressable elements); (2) the possibility of reducing the cycle time, thereby to increase the processing speed of the data manipulation; and (3) improving the topology of circuit to gain surface area for additional circuits and functionality or to increase the miniaturization of circuit.

BRIEF DESCRIPTION OF THE DRAWINGS

Other features, characteristics and advantages of the invention will appear to one of ordinary skill in the art upon reading the description below of a preferred embodiment of the present invention, made with reference to the annexed drawings, in which like reference characters refer to like elements, and in which:

FIG. 1 is a schematic block diagram of an elementary interconnection structure ring according to an embodiment of the present invention;

FIG. 2 is a schematic diagram of a plurality of rings associated in a hierarchical structure according to the present invention;

FIG. 3 is a circuit schematic illustrating the way in which a gateway circuit can be inserted on the ring of FIG. 1 to couple the ring to a higher order ring; and FIG. 4 is a block diagram of a topology of implementation of the various circuits of a structure such as that of FIG. 2.

DETAILED DESCRIPTION OF THE DRAWINGS

With reference to FIG. 1, an elementary ring configuration is described, which, associated with other similar configurations, will make it possible to obtain an interconnection structure of the present invention. This elementary configuration comprises a plurality of stages 10, 20, 30 (here, three are shown, this number of course not being at all restrictive, and a ring could include quite a larger number of stages). Each stage 10, 20, 30 includes a register 11, 21, 31 and one multiplexer 12, 22, 32 having at least two inputs A, B and one output.

The various inputs and outputs of the registers and multiplexers all are part of a group of conductors on which information is transferred in parallel, for example, a group of eight conductors corresponding to information vectorized by eight bits; represented by a single slash line on the drawings. Each register 11, 21, 31 can indicate an addressable element of a microcomputer, such as a RAM, a ROM, a DMA interface access, interrupt management registers, temporization registers, etc. Each register also has an input port and a distinct output port, each port being one-way (unidirectional) and functioning with logic having two states, i.e., it is not likely to have an indefinite high impedance state.

Inputs 13, 23, 33 of each stage 10, 20, 30 are applied simultaneously on the one hand to the input port of registers 11, 21, 31 respectively, and on the other hand to the input port A of the respective multiplexers 12, 22, 32. The other input, input port B, of the multiplexers, is connected to the output port of the associated registers.

A command logic, which is not illustrated but which is deemed to be within the abilities of a person of ordinary skills to prepare, activates the writing signals W1, W2, W3 of registers 11, 21, 31 and the selection signals SEL1, SEL2, SEL3 of multiplexers 12, 22, 32.

The output 14 of stage 10 (the output port of multiplexer 12) is applied to the input 23 of stage 20, the output 24 of stage 20 (the output port of multiplexer 22) is applied to the input 33 of stage 30, and output 34 of stage 30 (the output port of multiplexer 32) is fed back to input 13 of stage 10 by a line 40. This provides a closed ring on which the data will be able to circulate (flow) in a one-way direction (i.e., stage 10 to stage 20, then stage 20 to stage 30, then stage 30 to stage 10 and so long, but never in the reverse direction).

When an addressable element of the microcomputer is not addressed, the selection signal SEL to the corresponding multiplexer is not activated (effectively resulting in a selection from the input port A), and the multiplexer simply transfers the contents applied at the input of the stage to the output of this same stage, then to the input of the following stage, etc. If no selection signal is activated among the various stages of the ring, the value of the data applied at the input of the first stage will be preserved throughout the ring, the closed loop of multiplexers playing a part of a lock. The terms loop and ring are used interchangeably.

With such a loop, there is a low, but non-zero probability, of an oscillation phenomena. Indeed, each multiplexer presenting a non-zero delay for the transmission from the input to the output, could propagate a transitory disturbance on the loop, with a risk of an appearance of a high current associated with the oscillation. To minimize this risk, the command logic is constructed so as to maintain the state of the selection signals SEL used at the time of the last cycle during which the ring was addressed, and, when no register associated with the ring was addressed, the last selection signal SEL applied is maintained activated (this is referred to as the principle "of the last applied selection signal").

When, on the other hand, the addressable element of the microcomputer corresponding to one of the stages in the ring is addressed, for example, for a cycle of reading or writing, the selection signal SEL to the corresponding multiplexer is activated (a selection of the input port B), so that the multiplexer transfers the contents from the register to the output of the considered stage, which is thus applied to the following stage. If the stage is being addressed for a cycle of writing, the writing signal W is also activated, indicating to the addressed register that it is necessary to lock on the data applied at the input of the stage. When a register is addressed (selection of a stage), it thus produces a data which will be introduced into the ring and will be propagated along this ring and return to the input port of the selected stage.

It can thus be noted that, even in this elementary ring structure, two of the disadvantages of the bi-directional buses mentioned above are overcome. First, the high impedance state is avoided, and thus the possibility of input signals floating according to the sequencing. Second, the signals are moving one-way and are controlled, and there is no possibility, at any moment, to have bus conductors acting in opposed directions with a consequent rise in the current and increase in energy consumption.

Starting from the aforementioned elementary ring configuration, the invention also proposed to associate, by an appropriate coupling, a plurality of rings so as to constitute a hierarchical ring structure. FIG. 2 illustrates such a hierarchical structure.

The highest level or highest order ring is a one-way closed ring 50, which will be called the "root ring". The central processing unit CPU is preferably coupled to the root ring 50.

On this root ring 50 are coupled via gateways G1, G2 . . . GN, N pluralities of rings or groups of rings organized in a bunch of clusters CL (designated CL1, CL2, CL3 in this example). A bunch CL can be a single isolated ring 60, as illustrated for bunch CL3, such that the hierarchy for this bunch has only two levels, namely root ring 50, and end ring 60. A bunch CL can itself be made up, as illustrated for bunches CL1 and CL2, of a ring 60 also comprising gateways such as G11, G12, G21, G22, towards rings 70 of a still lower level. The hierarchy for these bunches CL thus has three levels, in this example, root ring 60, intermediate ring 60, and end ring 70 (in descending hierarchical order).

In one preferred embodiment, the stages 10, 20, 30 associated with each addressable element of the microcomputer are located on the lowest level rings, with the intermediate level rings being preferably (but not necessarily) only transition rings comprising only gateways to the higher and the lower levels.

Referring now to FIG. 3, the structure of a gateway G allowing the transfer of data between two levels of the hierarchy is shown. The basic structure of the ring illustrated is primarily the same one as that of FIG. 1, with a plurality of stages 10, 20, 30, each one associated with an addressable element of the microcomputer, with the difference that one interposes the gateway G on the conductor of return line 40 connecting output 34 of the last stage 30 of the ring to input 13 of the first stage 10 of this same ring.

The gateway G includes a stage 90 having an input 91 coming from a higher order ring, an input 93 coming from a lower order ring (connected at output 34 of stage 30) and an output 94 bound for this same lower order ring (connected to input 13 of the first stage 10). The gateway 90 includes two multiplexers 95, 96 having two inputs A and B, controlled by a common single selection signal SEL0. The input signal 91 is applied at input A of multiplexer 95 and the input B of multiplexer 96, and input 93 is applied to the input B of multiplexer 95 and input A of multiplexer 96. Output 92 is connected to the output of multiplexer 95, and output 94 to the output of multiplexer 96. With such a configuration, if the selection signal SEL0 is not activated, the two multiplexers will transfer to their respective outputs the signal present on their inputs A, so that the signals will circulate, without change, separately, on each of the two rings coupled by the gateway G.

On the other hand, if signal SEL0 is activated, input 91 will be connected to output 94 and input 93 to output 92, so that the upstream signal coming from the higher order ring will be transferred to the lower order ring at the input from the first stage 10, and the signal collected at the output of the last stage 30 of the lower order ring will be applied downstream to the higher order ring. The selection signal SEL0 is activated each time any of the stages of the lower order ring is addressed, i.e., in the illustrated example, each time one of signals SEL1, SEL2, or SEL3 is activated.

To obtain a hierarchical structure with more than two levels, one can replace one or more stages in a given level, such as stages 10, 20, or 30, by another gateway G, which will control the transfer of information along the ring or the rings of a lower order. The selection signal of this gateway is then activated each time that a register of the lower level ring, or a register of a ring of an even lower level, dependent on this gateway, is activated.

It is thus possible, starting from the central processing unit CPU located on the root ring 50, to reach one of the registers corresponding to an addressable element, by suitable activation of the selection signals of the different gateways leading to the registers associated with this addressed element.

The command logic of the various gateways G can be constructed so that only the segments (rings) necessary to convey a data of a register source on one ring to a register destination on another ring need to change state. In this manner, all the other segments of data located elsewhere in the hierarchy of the bunch are maintained entirely static and thus do not consume any energy in connection with the particular data transfer.

Preferably, one can group on the same chip (integrated circuit) a significant number of addressable elements. For example, a typical chip of a programmable DDD pacemaker comprises, among other things, approximately 160 different registers to be reached (DMA, registers of temporization, registers of interrupt management), 31 different RAMs, and 12 different ROMs. The number of elements per ring is then selected so as to carry out a compromise between, on the one hand, the saving in energy desired (by multiplying the number of rings one increases the selectivity resulting from the hierarchical structure, and thus its performance), and on the other hand, the complexity of realization of the system in a practical configuration on silicon. In practice, it is believed that one can locate the optimum number of addressable elements at approximately 6 to 10, typically 8, addressable elements per ring.

In addition, this hierarchical bunch structure allows the addition of new addressable elements in the hierarchy without substantial modification of the total energy consumption of the circuit, and without affecting the access time to the elements already present.

With regard to the root ring 50, its structure is typically adapted to its particular position. Root ring 50 typically contains central processing unit CPU of the microcomputer and gateways G1, G2, GN towards all of the ring bunches of the system. In addition, to ensure the exchanges with the external world, it is envisaged to provide a particular gateway GI/O ensuring an input/output interface between the root ring 50 and a bi-directional bus 80 of the traditional type, which may be necessary to interface with other chips, for example, the standard memories and circuits concerning the management of the microcomputer peripherals.

With regard to the selection signals of the gateways G1, G2, GN, GI/O of the root ring 50, those must separately be controlled in order to make it possible for the data to be propagated on the root ring 50 for the operations of writing and reading of the central processing unit. In particular, for this reason, a gateway GI/O is preferably positioned immediately before central processing unit CPU, in the direction of propagation of data.

With regard to the topology of the circuits, one envisages an adapted implementation so that the logical circulation of information in the various rings and bunches corresponds to a minimal length of conductor (circuit traces) on the microcircuit. For example, as illustrated in FIG. 4, one organizes the arrangement of the circuits of various bunches CL1, CL2, CL3 in respective fields, and one places these fields on the circuit so that the field corresponding to a given bunch is adjacent to the field corresponding to the immediately following bunch, etc., in order to minimize the physical lengths of conductors, taking into account the direction of information flow inside the same bunch and from one bunch to the following bunch.

One skilled in the art will appreciate that the present invention can be practiced by other than the described embodiments, which are presented for purposes of illustration and not of limitation.

We claim:

1. An active implantable medical device comprising:
   an interconnection structure for use in a data exchange between a plurality of addressable elements of a microcomputer, said interconnection structure comprising an interconnection artery for parallel transfer of an information to be exchanged on a group of conductors, wherein said interconnection artery comprises at least one ring on which said information circulates in a closed loop and in a one-way direction, and at least one coupling point coupling said at least one ring to one of the addressable elements.

2. The device of claim 1, wherein said at least one coupling point further comprises a plurality of coupling points connecting said at least one ring to preselected ones of the plurality of addressable elements.

3. The device of claim 2, wherein said at least one ring further comprises a first ring and second ring, the second ring being a lower order ring than the first ring, wherein at least one of said coupling points further comprises a gateway interconnecting the first ring and the second ring, wherein information circulates in a closed loop and in a one-way direction on the second ring.

4. The device of claim 3, further comprising at least a third ring having an order relative to the first and second rings wherein said first, second and third rings comprise a hierarchical structure.

5. The device of claim 4, wherein one of said addressable elements further comprises a central processing unit, and one of said rings has a highest order, said highest order ring comprises a coupling point connecting said highest order ring to the central processing unit.

6. The device of claim 4, wherein the third ring has an order lower than the second ring and is coupled to the second ring by a coupling point, wherein the gateway further comprises a multiplexer to selectively transfer in said one-way direction on the first ring the information received from the second ring, if the coupling point corresponding to an addressed element is on the second ring or the third ring coupled to the second ring, and otherwise the information received from the first ring.

7. The device of claim 1, wherein said at least one ring further comprises a first ring and second ring, the second ring being a lower order ring than the first ring, wherein said at least one coupling point further comprises a gateway interconnecting the first ring and the second ring, wherein information circulates in a closed loop and in a one-way direction on the second ring.

8. The device of claim 7, further comprising at least a third ring having an order relative to the first and second rings wherein said first, second and third rings comprise a hierarchical structure.

9. The device of claim 8, wherein one of said addressable elements further comprises a central processing unit, one of said rings has a highest order, said highest order ring comprising a coupling point connecting said highest order ring to the central processing unit.

10. The device of claim 8, wherein the third ring has an order lower then the second ring and is coupled to the second ring by a coupling point, wherein the gateway further comprises a multiplexer to selectively transfer in said one-way direction on the first ring the information received from the second ring, if the coupling point corresponding to an addressed element is on the second ring or the third ring coupled to the second ring, and otherwise the information received from the first ring.

11. The device of claim 2, wherein at least some of the coupling points each further comprise a register associated with a corresponding addressable element.

12. The device of claim 11, wherein said at least one ring further comprises a first ring and a second ring, the second ring being a lower order ring than the first ring, further comprising a multiplexer to transfer selectively in said one-way direction on the first ring the contents of the register, if the coupling point corresponds to an addressed element on the second ring, and otherwise the information received from the first ring.

13. The device of claim 2, further comprising a bi-directional data exchange bus, wherein at least one of the coupling points is a coupling point to the bi-directional data exchange bus.

14. The device of claim 13, wherein one of said addressable elements further comprises a central processing unit, one of said rings has a highest order, said highest order ring comprises a coupling point connecting said highest order ring to the central processing unit, said coupling point to the bi-directional data exchange bus immediately preceding the central processing unit (CPU) on said first ring in the direction of flow.

15. The device of claim 1, in which the interconnection artery conductors are configured with two level logic, whereby said two level logic is substantially without a high impedance state.

16. The device of claim 7, further comprising a topology of implementation of said microcomputer comprising a first field and a second field, the first field comprising any addressable elements coupled to said first ring, the second field comprising any addressable elements coupled to the second ring, wherein the first field is adjacent to the second field in the direction of information flow.

17. The device of claim 1 wherein said device is selected from the group consisting of a pacemaker and a cardiac defibrillator.

18. The device of claim 1 wherein said device is battery operated.

19. The device of claim 1 wherein said plurality of addressable elements is selected from the group consisting of a RAM, a ROM, a DMA interface access, an interrupt management register, and a temporization register.

* * * * *